G. B. FOWLER.
Adding Machine.
No. 39,222.  Patented July 14, 1863.
Fig. 1.
| 9 | 8 | 7 | 6 C 5 | 4 | 3 | 2 | 1 |
|---|---|---|---|---|---|---|---|
| O | OaO | OBO | OaO | O | O | O | O |
| 9 | 8 | 7 | 6 C 5 | 4 | 3 | 2 | 1 |
| O | OaO | O | O OaO | O | OaO | O |  |
| 9 | 8 | 7 | 6 C 5 | 4 | 3 | 2 | 1 |
| O | O | OaOBO | O OaO | O | O | O |  |
| 9 | 8 | 7 | 6 C 5 | 4 | 3 | 2 | 1 |
| O | OaO | O OBO | O | O | O | O |  |
| 9 | 8 | 7 | 6 C 5 | 4 | 3 | 2 | 1 |
| O | OaO | OBO | O | OaO | OaO |  |  |
| 9 | 8 | 7 | 6 C 5 | 4 | 3 | 2 | 1 |
| OaO | OBO | OaO | O | OaO |  |  |  |
| 9 | 8 | 7 | 6 C 5 | 4 | 3 | 2 | 1 |
| O | OaO | OBO | OaO | O | OaO |  |  |
| 9 | 8 | 7 | 6 C 5 | 4 | 3 | 2 | 1 |
| O | OaO | OBO | OaO | O | OaO |  |  |
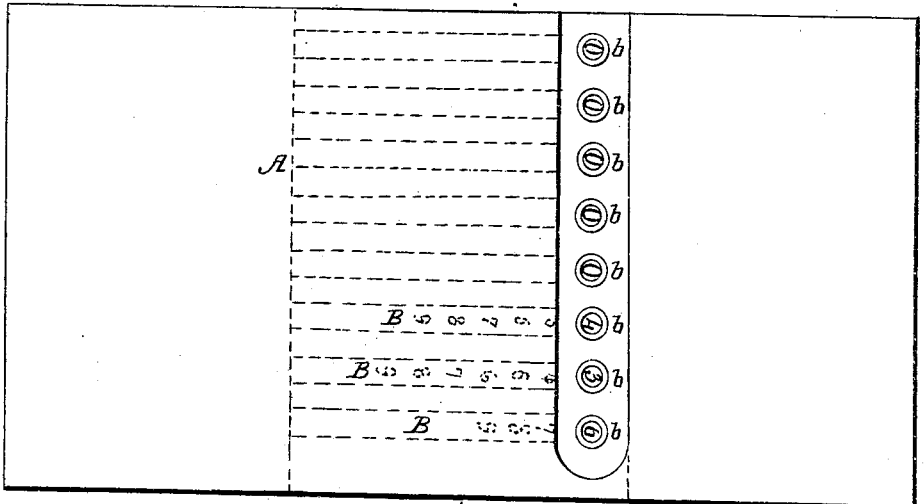
Fig. 2.
Fig. 3.
Witnesses:  Inventor:

UNITED STATES PATENT OFFICE.

GEORGE B. FOWLER, OF CHICAGO, ILLINOIS.

IMPROVEMENT IN ADDING-MACHINES.

Specification forming part of Letters Patent No. 39,222, dated July 14, 1863.

*To all whom it may concern:*

Be it known that I, G. B. FOWLER, of Chicago, in the county of Cook and State of Illinois, have invented a new and Improved Adding-Machine; and I do hereby declare that the following is a full, clear, and exact description of the same, reference being had to the accompanying drawings, forming a part of this specification, in which—

Figure 1 represents a plan or top view of my invention. Fig. 2 is an inverted plane of the same. Fig. 3 is a longitudinal vertical section of the same.

Similar letters of reference in the three views indicate corresponding parts.

This invention is intended as an improvement on that class of calculating-machines for which a patent was granted to S. S. Young, July 24, 1849; and the improvement relates, principally, to the mode of disposing the figures on the lower surface of the slides and on the upper surface of the bed or platform, and to the mode of indicating the result of the calculation, as will be apparent from the following description:

A represents the bed or platform, which is provided with a series of grooves, in which the slide B moves backward and forward. The platform A is made of wood or of metal, and its ends are protected by caps D D', which also cover the slides and secure their ends against injury. The slides B are placed at such distances apart that strips C' are formed between them, the width of which is about equal to that of the slides. Each of the strips is marked with the figures from 1 to 9, and each of the slides is provided on its upper surface with eighteen holes, *a*, and on its under surface are marked the figures from 0 to 9, as clearly shown in dotted lines in Fig. 2. The surfaces of the slides are divided into two halves, which are distinguished from each other by different colors, or by any other suitable mark, and if said slides are pushed back so as to bring the dark-colored portions under the cap D, ten of the holes *a* in the surface of each slide are visible in the open space between the caps D D'. The platform or bed A is perforated with a series of apertures, *b*, (see Fig. 2,) right under the slides, and so situated that if said slides are all pushed back under the cap D as far as they will go the ciphers marked on the under sides of the slides are exactly over said apertures, so that they are visible if the platform A is turned upside down, and if the slides are in this position the holes *a* in their upper surfaces are exactly opposite to the figures marked on the intermediate strips, C. The slides are moved by means of a pin or pencil, which is inserted into the holes *a*, and a small spring, *c*, acting on the under surfaces of said slides, prevents them moving spontaneously.

The operation is as follows: The upper or first slide represents the units, the next the tens, the third the hundreds, the fourth the thousands, &c., and if it is desired to add two numbers—for instance, 251 and 185—the pin or pencil is inserted into the hole opposite the figure 1 on the first slide, and said slide is pushed toward the right until the pin strikes the cap D'. It is now withdrawn and inserted into the hole opposite the figure 5 on the second slide, and this slide is also moved toward the right until the pin comes in contact with the edge of the cap D', and then the pin is inserted into the hole opposite the figure 2 on the third slide, and said slide is moved to the right until the pin touches the edge of the cap D'. The second number is disposed of in the same manner. The pin is inserted into the hole opposite the figure 5 on the first slide, and said slide is moved to the right as far as the cap D' will allow. The pin is now withdrawn and inserted into that hole on the second slide which is opposite to the figure 8 on the adjoining strip, C. It will be noticed that this hole is on the dark portion of said slide which indicates that said slide has to be moved toward the left until the pin strikes the edge of the cap D, and one is to carry to the next slide. This one may either be worked separate by inserting the pin into the hole opposite to the figure 1 on the third slide and moving to the right or it may be mentally added to the remaining figure 1 in the second figure, and worked simultaneous with this figure by inserting the pin into the hole opposite the figure 2 and moving to the right. In practice, it will produce less liability of mistakes if the figures to be carried are worked separately. The result of the operation is ascertained by turning the platform A upside down and noticing the figures appearing on the under side of the slides opposite to the apertures *b* in the platform. It will be found that this result is 436. From this explanation it will be understood that whenever the figure to be added is opposite to the light part of the respective slide said slide is moved toward the right, and whenever the figure to be added is opposite to the dark portion of the respective slide said slide is moved toward the left, and one is carried to the next slide. This rule holds good in all cases, whether the various numbers be added up in the order as above described or in any other order. For instance, if the following figures have to be added:

$$9,999$$
$$9,999$$
$$9,999$$
$$\overline{29,997}$$

The right hand column may be added up first by inserting the pin into the hole of the first slide opposite the figure 9 on the adjoining strip and moving to the right. In adding the second 9, that hole on the first slide which is now opposite the figure 9 will be found to be on the dark portion of said slide, and, consequently, the slide has to be moved to the left, and one is carried to the second slide by inserting the pin into the hole opposite the figure 1 and moving the slide to the right. The third 9 is now added, and that hole on the first slide which is opposite to the figure 9 on the adjoining strip is again moved to the left, and one is to be carried to the second slide in the same manner as above. The second column, or the tens, is then added up by inserting the pin in that hole on the second slide which is opposite to the figure 9 on the adjoining strip. This hole is siuated on the dark portion of the slide, and, consequently, said slide has to be moved toward the left, and one is carried to the next slide, &c., and if the whole operation is carried on correctly the figures 29,997 will appear in the apertures $b$ under the slides as the correct result.

These examples may suffice to explain the operation of my machine, which is unsurpassed by its simplicity and cheapness.

What I claim as new, and desire to secreu by Letters Patent, is—

The arrangement of the apertures $b$, in the under side of the platform or bed A, to operate in combination with the figures on the under side of the slides B, and with said slides, strips C, and caps D D', in the manner and for the purpose herein shown and described.

GEO. B. FOWLER.

Witnesses:
HARLOW PEASE,
JACOB J. ENOS,